(12) United States Patent
Goodall et al.

(10) Patent No.: US 7,683,773 B1
(45) Date of Patent: Mar. 23, 2010

(54) TELEMETRY DATA IN PACKET EXCHANGES

(75) Inventors: David S. Goodall, St. Leonards (AU); Geoffrey J. Smith, Mt. Gravatt (AU); Philip J. Ryan, Stanmore (AU); Gordon T. Foyster, Mooball (AU)

(73) Assignee: G2 Microsystems Pty, Ltd., Haymarket (AU)

( * ) Notice: Subject to any disclaimer, the term of this patent is extended or adjusted under 35 U.S.C. 154(b) by 385 days.

(21) Appl. No.: 11/809,377

(22) Filed: May 31, 2007

Related U.S. Application Data

(60) Provisional application No. 60/845,003, filed on Sep. 15, 2006.

(51) Int. Cl.
  *G08B 26/00* (2006.01)
  *G08B 13/14* (2006.01)
  *G07B 15/02* (2006.01)

(52) U.S. Cl. ............... 340/505; 340/539.13; 340/572.1; 340/5.8; 340/5.9; 340/5.92; 235/384; 705/13; 705/22

(58) Field of Classification Search .................. 340/505
  See application file for complete search history.

(56) References Cited

U.S. PATENT DOCUMENTS

| 7,012,529 | B2 * | 3/2006 | Sajkowsky ............... 340/572.1 |
| 7,136,832 | B2 * | 11/2006 | Li et al. ........................ 705/34 |
| 7,394,372 | B2 * | 7/2008 | Gloekler et al. .......... 340/572.1 |
| 7,487,037 | B2 * | 2/2009 | Schmidtberg ............... 701/201 |
| 2007/0285240 | A1 * | 12/2007 | Sensenig et al. ......... 340/572.1 |

* cited by examiner

*Primary Examiner*—Donnie L Crosland
(74) *Attorney, Agent, or Firm*—Blakely Sokoloff Taylor & Zafman LLP

(57) ABSTRACT

Telemetry data may be included in packet exchanges of authentication protocols. In one example, a tag, associated with shipped goods, authenticates with a local area network that is associated with a destination of the goods. An identification is received from the tag and the authentication and the identification are sent to a remote location as an indication of the goods being at the destination.

20 Claims, 8 Drawing Sheets

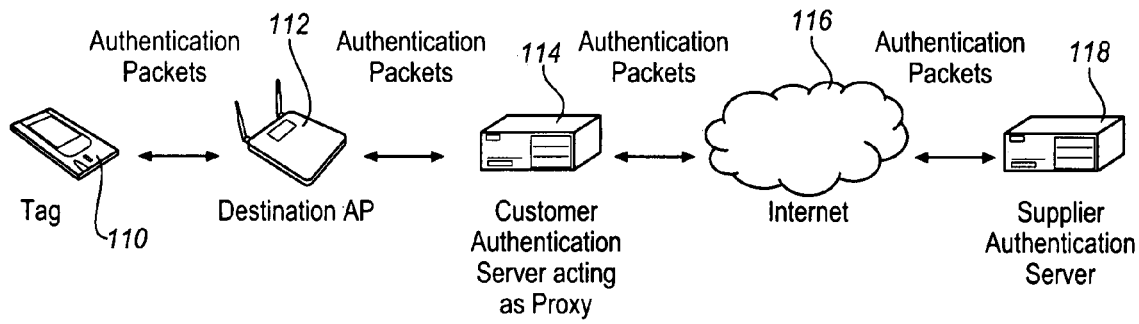
FIG. 1
FIG. 2
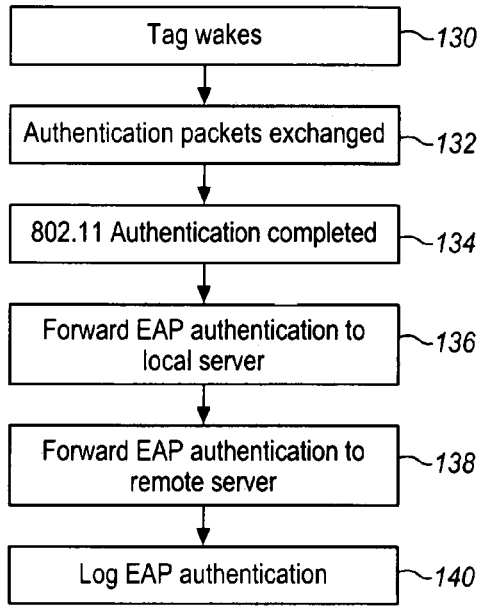

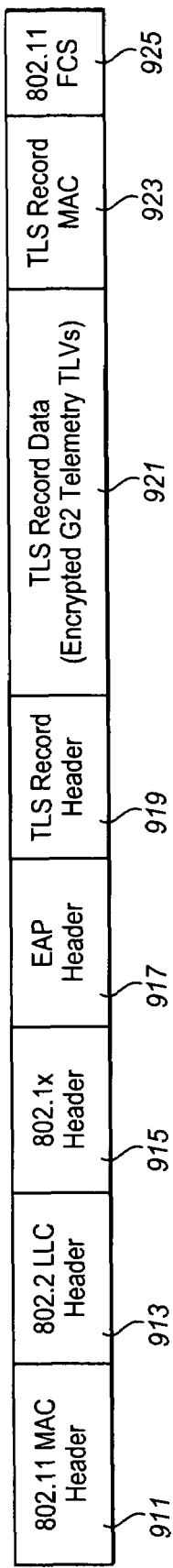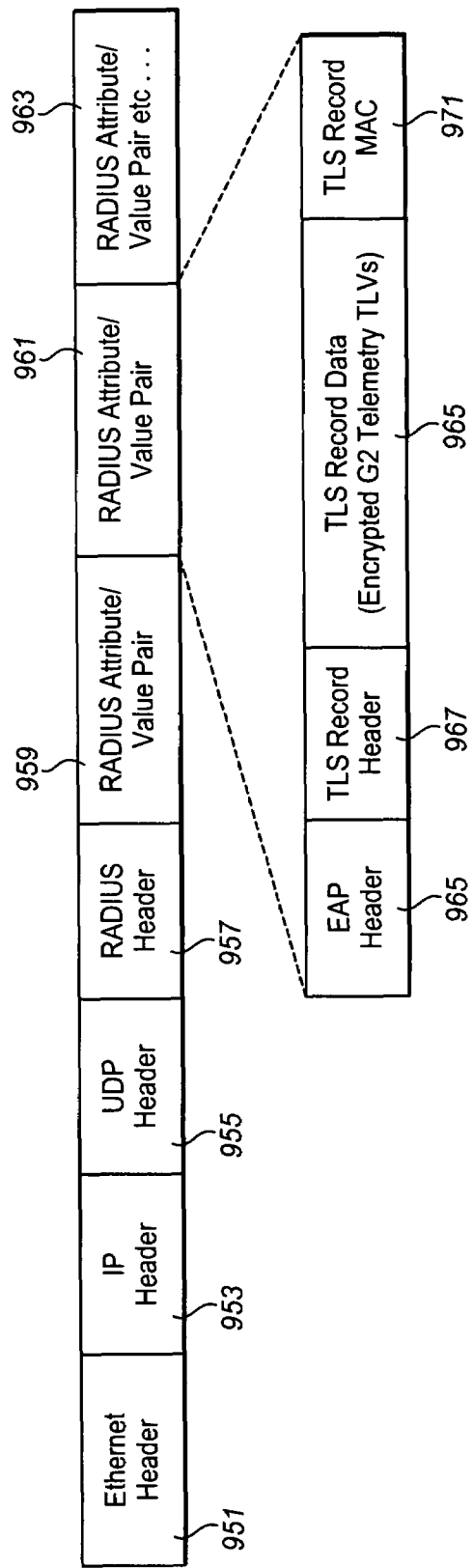
FIG. 9
FIG. 10

TELEMETRY DATA IN PACKET EXCHANGES

CROSS-REFERENCE TO RELATED APPLICATIONS

The present application claims the priority of provisional application Ser. No. 60/845,003, Entitled "Supply Chain Tracking Using Radio Frequency Identification Tags", filed Sep. 15, 2006.

BACKGROUND

1. Field

The present description relates to the field of tracking goods through a supply chain and, in particular, to determining a location of an identification tag through an access point using authentication protocols.

2. Related Art

In a supply chain, it may be difficult to track the location of goods sent from a supplier to a customer. RFID (Radio Frequency Identification) tags attached to the goods are proposed to allow the location of the attached goods to be tracked. Smart RFID tags are also able to monitor environmental conditions and the time. This allows the tag to provide some indication as to the potential state of the goods on arrival. An RFID tag, however, requires an RF reader that can communicate with the tag and then report the position of the tag while the tag is in transit or at least when the tag arrives at the customer's premises. For the tag to be tracked while it is in transit, there must be tag readers along the supply chain to the customer.

Tracking the goods during shipping or in transit using RFID tags requires, not only a tag reader infrastructure to poll tags and determine their identity and locations, but also some way to communicate that information to the supplier and to the customer. Existing wireless networks are not well equipped, to provide communication to remote suppliers and customers.

SUMMARY OF THE INVENTION

Telemetry data may be included in packet exchanges of authentication protocols. In one example, a tag, associated with shipped goods, authenticates with a local area network that is associated with a destination of the goods. An identification is received from the tag and the authentication and the identification are sent to a remote location as an indication of the goods being at the destination.

BRIEF DESCRIPTION OF THE DRAWINGS

The invention may be more fully appreciated in connection with the following detailed description taken in conjunction with the accompanying drawings, in which like reference numerals refer to corresponding parts throughout the several views of the drawings, and in which:

FIG. 1 is a block diagram of an example inventory tracking system in use with an RFID tag according to an embodiment of the present invention;

FIG. 2 is a process flow diagram of authenticating a tag according to an embodiment of the present invention;

FIG. 9 is a diagram of an 802.11 packet with embedded telemetry data according to an embodiment of the present invention;

FIG. 10 is a diagram of an Ethernet packet with embedded telemetry data according to an embodiment of the present invention.

DETAILED DESCRIPTION

Figure 3:
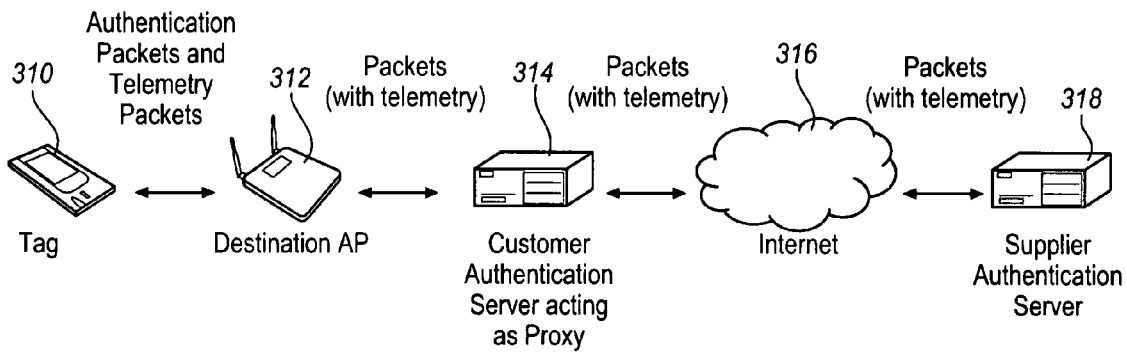
FIG. 3 is a block diagram of an example inventory tracking system in use with an RFID tag according to another embodiment of the present invention.

Using aspects of the embodiments described below, many improvements may be made to tracking inventory through the supply chain. The tag can be authenticated at the destination to the satisfaction of the supplier and the customer receiving the goods. The supplier can be reliably notified that the real tag has arrived at the destination. The tag can send telemetry data to the supplier to indicate that the goods arrived in good order. For example, the tag can report that the goods were not exposed to environmental extremes. After reporting, the tag can be informed that its work is done and that it may optionally switch off.

In one example, a tag may be activated in order to perform an authentication to a server. This may be, for example, an EAP (Extensible Authentication Protocol) authentication to a RADIUS (Remote Authentication Dial In User Service) server. The authentication may be done, for example, when the tag arrives at the customer location or customer's premises. The authentication may also be done at a point along the supply chain at any other convenient location. The successful EAP authentication by the tag may be logged and the log may be used as the basis of a report to the supplier, to the customer, or to any other desired intermediary.

This is most easily done when the tag authenticates to a RADIUS server belonging to the supplier. However, the authentication may be done with any appropriate server and the report then transmitted to the supplier and other interested parties. This will work for any existing EAP method supported by both the tag and the supplier's RADIUS server. Suitable candidates could be EAP-TLS (EAP Transport Layer Security), EAP-TTLS (EAP Tunneled Transport Layer Security), PEAP (Protected EAP), EAP-FAST (EAP Flexible Authentication via Secure Tunneling), etc In the discussions that follow, references to RADIUS services can equally apply to DIAMETER services or to any of a variety of other similar services. DIAMETER is intended to be a replacement for RADIUS but is not yet widely deployed.

Reporting may be provided through the supply chain based on using a modified version of an existing EAP authentication method (EAP-TLS in the examples below). This may be used to set up a tunnel in which encrypted telemetry data is transported encapsulated within EAP packets. The wireless client, such as a low power 802.11 (Standard for, wireless networking promulgated by IEEE (Institute of Electrical and Electronics Engineers)) location or sensor tag in this case, does not require direct wireless network access, or an IP address, in order to send its telemetry data. Therefore the wireless network remains more secure and the tag saves battery power by avoiding the requirement to obtain an IP address and by avoiding the overhead of upper layer protocols to transmit its data.

The EAP authentication method may be modified to allow tags to send encrypted telemetry data as part of an EAP packet exchange. An example is described based on the EAP-TLS protocol. Another example also supports EAP-TLS with session resumption. Other existing and future EAP methods such as PEAP, EAP-TTLS, or EAP-FAST, etc, may also be used to carry tag telemetry data. In addition, the modified EAP authentication method may also be used as an inner EAP method by EAP methods that support inner EAP methods. The modifications are only needed at the end points of the communications link, for example a tag client and a supplier RADIUS server. No changes are required at the access point or in any intermediate proxy RADIUS servers.

To support tags using EAP-TLS for example, a separate WLAN (Wireless Local Area Network) for tags may be configured at the customer's premises for 802.1x (any of the IEEE standards that begin with the characters 802.1, such as 802.11n, 802.16, etc.) authentication using EAP-TLS, with appropriate encryption. WEP (Wired Equivalent Privacy), WPAv1 or WPAv2 (Wi-Fi Protected Access version 1 or 2) or any encryption method supported by the access point may be used. The supplier configures the tag with a client certificate and with trusted root and/or trusted server certificates. The customer's RADIUS server is configured as a proxy with respect to tags. It passes RADIUS packets related to tag authentication to the supplier's RADIUS server which performs the EAP authentication and logs successful and unsuccessful authentications. Tags from other suppliers and wireless clients other than tags may be differentiated by the customer's RADIUS server and handled locally. RADIUS accounting packets related to tags' authentications may also be forwarded, separately to other clients' accounting packets and to the supplier's RADIUS server.

In this scenario, the tag does not need to obtain an IP address, since it only authenticates with the supplier's RADIUS server and does not send any higher layer data traffic. This means that the destination wireless network can be made secure, but without an IP address, the tag cannot directly send telemetry data to the supplier. The tag does have access to the destination wireless network at the 802.11 MAC (Media Access Control) layer 2 and so, for added security, this particular network may be configured to block any data traffic from tag clients which is not EAP related. If the tag's authentication is successfully communicated with the supplier's RADIUS server, then the tag may switch off to save power. For EAP-TLS, after a successful EAP authentication exchange, the tag has properly validated the server's identity against the server or one or more root certificates already loaded on the tag or against both. As the tag does not have an IP address or network layer 3 connectivity in this scenario, the tag is unable to check certificate revocation lists.

FIG. 1 shows an example of the type of location process discussed above. In FIG. 1, an RFID tag 110 is attached to goods that are being tracked. The goods have arrived at a location which may be the customer's premises or anywhere else along the supply chain. The tag wakes or is awakened at the site and finds and associates with a nearby WAP (Wireless Access Point) 112. The WAP is, at least, configured for IEEE 802.1x authentication and may also be configured for a wide range of other functions. The tag then authenticates with the supplier authentication server 118 via the WAP 112 and customer authentication server 114. So, for example, 802.11 layer 2 packets for authentication, association, EAP authentication and key derivation may be exchanged between the tag and the WAP. The connection between the server 114 and the WAP 112 may be wireless or wired.

The WAP is in communication with a server 114, for example a RADIUS server managed by the owner of the facility where the tag is located. In the example of FIG. 1, the tag is at the customer's location and the RADIUS server is managed by the customer. The WAP communicates RADIUS authentication packets for all of the wireless clients that attempt to authenticate using an EAP method to the customer's server. This will include the tag 110 in FIG. 1, any other tags, as well as any other wireless clients that the WAP is configured to support. In the case of the tag 110 the customer's server 114 acts as a proxy and is able to send RADIUS authentication packets through the Internet 116 to the supplier's RADIUS authentication server 118. The authentication packets may alternatively, be sent through a proprietary network, a private network, or any other type of connection, whether wireless or wired. While FIG. 1 identifies the server 118 as the supplier's server, the server may be owned or managed by an intermediary or any other interested party.

The appearance in the supplier RADIUS server log of a successful authentication may be used to infer that the successfully authenticated tag has arrived at the destination. It may further be used to infer that the customer can now be invoiced for the goods, etc. RADIUS or a similar communications protocol provides all the necessary structure for the authentication to be entered into a log at the supplier's server 118. Another process or server may then be used to update the location of the tagged goods, perform any billing actions, status updates or the like. For example, an external process or server (not shown) may check the supplier's RADIUS log periodically, or check the log after some kind of interrupt, such as an SNMP (Simple Network Management Protocol) trap, and take appropriate action.

This approach may be summarized in the process flow diagram of FIG. 2. At block 130 the tag wakes. This may be due to an internal timer, a poll or wake signal from the WAP, a signal from a card reader or for a variety of other reasons. Typically, a tag that is attached to the goods will be battery powered and will have some sort of power management program to prevent the battery from being depleted before the goods arrive at their destination. However, this may not be necessary and the tag may be a passive tag with no battery. The tag may then be awakened by receiving RF energy from any source that allows it to harvest that energy to send its identification information.

At block 132, 802.11 authentication packets are exchanged between the WAP and the tag. The packets may simply be sufficient for authentication or a more complex exchange may be used. In the example of 802.11 layer 2 packets, mentioned above, the packets may also be for association, at block 134, the authentication is successfully completed. After 802.11 authentication, EAP authentication is performed and a wide range of other operations and tasks may also be performed. However, the latter are not necessary to the present embodiment of the invention.

At block 136, the WAP forwards the EAP authentication packets to the local server. The EAP authentication packets will include the identity of the tag and the time at which the authentication occurred, among other items. This is just the information that is desired for tracking the goods associated with the tag. In the example above, the local server is the customer's RADIUS server, however, other protocols may be used and the server may be part of any of a variety of different types of infrastructure. The local server is able to act as a proxy to forward the authentication packet to the supplier's server at block 138. The supplier's server logs the authentication packet at block 140.

Generally, as part of any EAP authentication method based on EAP-TLS the following identity details may be reported back to the supplier RADIUS server:
AP MAC address,
AP IP address,
AP host name,
Tag MAC address,
Tag user name,
Tag certificate,
Customer RADIUS server IP address, and
Various other parameters if supported and configured.

The supplier's RADIUS server may report all or part of this information to the supplier's telemetry server (shown in FIG. 4 as 320) when a tag successfully authenticates.

The tag may optionally report the identity of the AP and the name of the 802.11 wireless network to which it has authenticated, which is also known as a service set identifier (SSID).

For some applications, the successful authentication of a tag via the customer AP to the supplier RADIUS server will be enough information to establish that a tag has arrived at its destination. Additional location information may be supplied by including location information in the SSID advertised by the customer's AP.

It has also been proposed that RADIUS or Diameter be augmented to communicate location information. In the future, APs may be configured with such information about their own physical location which they may then advertise in various management frames for example as part of the 802.11v Wireless Network Management standard. Alternatively, as an extension to current EAP methods, the AP could report its location to the tag client during the EAP authentication exchange. The AP location information could be included as an additional field in one of the EAP packets sent to the tag. The tag would then be able to report this information to the supplier telemetry server as part of its encrypted telemetry data.

The information from the authentication stored at the supplier may be put to use for a variety of inventory tracking and management purposes. This approach uses authentication of the tag at points along the supply chain through to the destination and notifies the supplier that the tag has arrived at each location. However, using this approach, without more, the tag cannot transmit telemetry data and cannot be switched off remotely.

Conventional EAP signals and protocols may be modified in order to provide still more information, such as telemetry information to the supplier's server. On arrival at the destination, telemetry data can be sent by the tag to the supplier's RADIUS server as an additional part of an EAP authentication exchange after an encrypted tunnel is set up. The additional EAP packets may then be transported by the customer AP and customer RADIUS server but since the contents are encrypted only the tag and the supplier RADIUS server can read them.

The existing EAP authentication method may be modified to include an extra EAP request and response packet exchange containing telemetry data. In the example below, EAP-TLS is used as the base protocol. EAP-TLS is, in turn, based on the EAP standard and TLS standard.

The first part of EAP-TLS sets up an encrypted tunnel between the tag and the supplier RADIUS server. Telemetry data may then be sent by the tag as application data within encrypted TLS packets. In addition, the EAP-TLS protocol may be modified so that the tag no longer has access to the destination wireless network, through for example the customer's AP, after the tag has successfully authenticated and delivered the telemetry data.

In order to allow the telemetry data to be sent to the supplier, support for telemetry data may be added in the wireless client (the tag) and in the supplier's RADIUS server. No changes are required in the wireless access point, the intermediate proxy RADIUS servers, or in any other part of the network infrastructure. The general packet flow is shown in FIG. 3.

In FIG. 3, an RFID tag 310 is associated with goods that have been delivered to a location. The tag authenticates as in FIG. 1. The tag 310 wakes or is awakened at the site and finds a nearby WAP (Wireless Access Point) 312. The WAP is configured, in this example, for EAP authentication with a local RADIUS server 314. The tag associates with the WAP and then exchanges information packets, using EAP authentication protocols.

The WAP is in communication with the local server 314, and communicates EAP authentication packets from the tag and any other wireless clients, depending on the application. As explained below, these packets from the tag may include telemetry data. The customer's server 314 acts as a proxy to encapsulate the EAP authentication packets from the tag in RADIUS packets and send them through the Internet 316 to the supplier's RADIUS authentication server 318. In contrast to the example of FIG. 1, these packets may include much more than authentication information.

Figure 4:
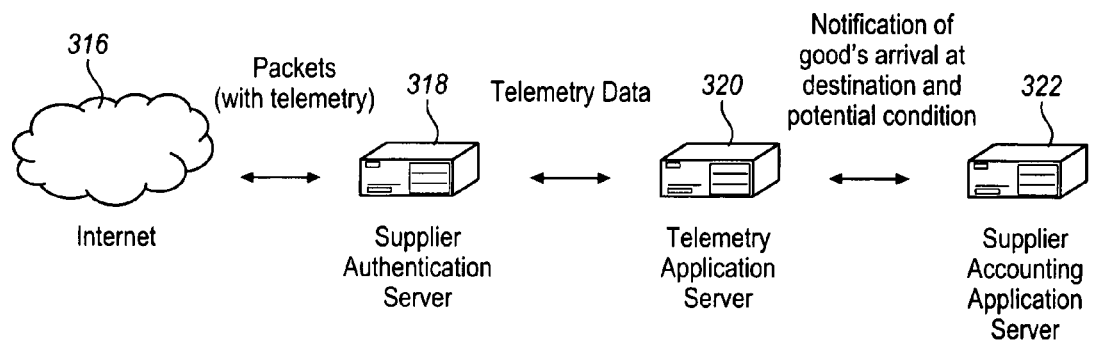
FIG. 4 is a block diagram of an example inventory tracking system in use with an RFID tag according to another embodiment of the present invention.

The telemetry data may be saved or passed to another process by the supplier RADIUS server 318 as part of handling the tag authentication. The telemetry data can then be made available to a separate telemetry application server 320 to read and process, as shown in FIG. 4. This server or process may process the data and flag or report to the supplier or a supplier system that the tag and goods have arrived. In the FIG. 1 context, only the arrival of the goods is known. In the FIG. 3 example, the telemetry server may be able to infer that the goods are in either good or bad condition based on the telemetry data.

The information from the telemetry server may be passed to, for example, an accounting server 322. The accounting server may use the information as the basis for further actions, such as invoicing the customer for the goods received, querying the customer proactively about the state of the goods on arrival if the telemetry data implies possible damage, flagging a possible insurance claim for damaged goods etc. There are a range of additional accounting system functions that may be enabled, such as automatically paying the transport company for items delivered in good order, or withholding payment in cases where the telemetry data indicates an infraction of negotiated carrying conditions. The carrying conditions that a tag can monitor include time, environmental limits, shocks, seal breakage, and the route taken, among others.

While the equipment and transactions of FIG. 4 are described as a continuation of FIG. 3, they may also be applied to FIGS. 1 and 2. The time of an authentication may be sufficient to infer a timely or untimely delivery of the goods associated with the tag. This may be recorded by the telemetry server and acted upon by the accounting application server. Any or all of the operations mentioned above in the context of FIGS. 3 and 4 may be applied to a combination of FIGS. 1 and 4.

While FIGS. 1, 3, and 4 show several different servers communicating with a wireless access point, this is done to more clearly illustrate the operations that may be performed. Any one or more of the servers may be combined and additional servers, as well as additional routers, modems, communications interfaces, protocol converters, and other devices may be used. Other communication pipelines may also be substituted for or added to the Internet. The positions of the illustrated servers is also not intended to require that some hardware be located next to other hardware. For example, the wireless access point may be located many kilometers from the customer server, or it may be integrated into the customer server.

Figure 5:
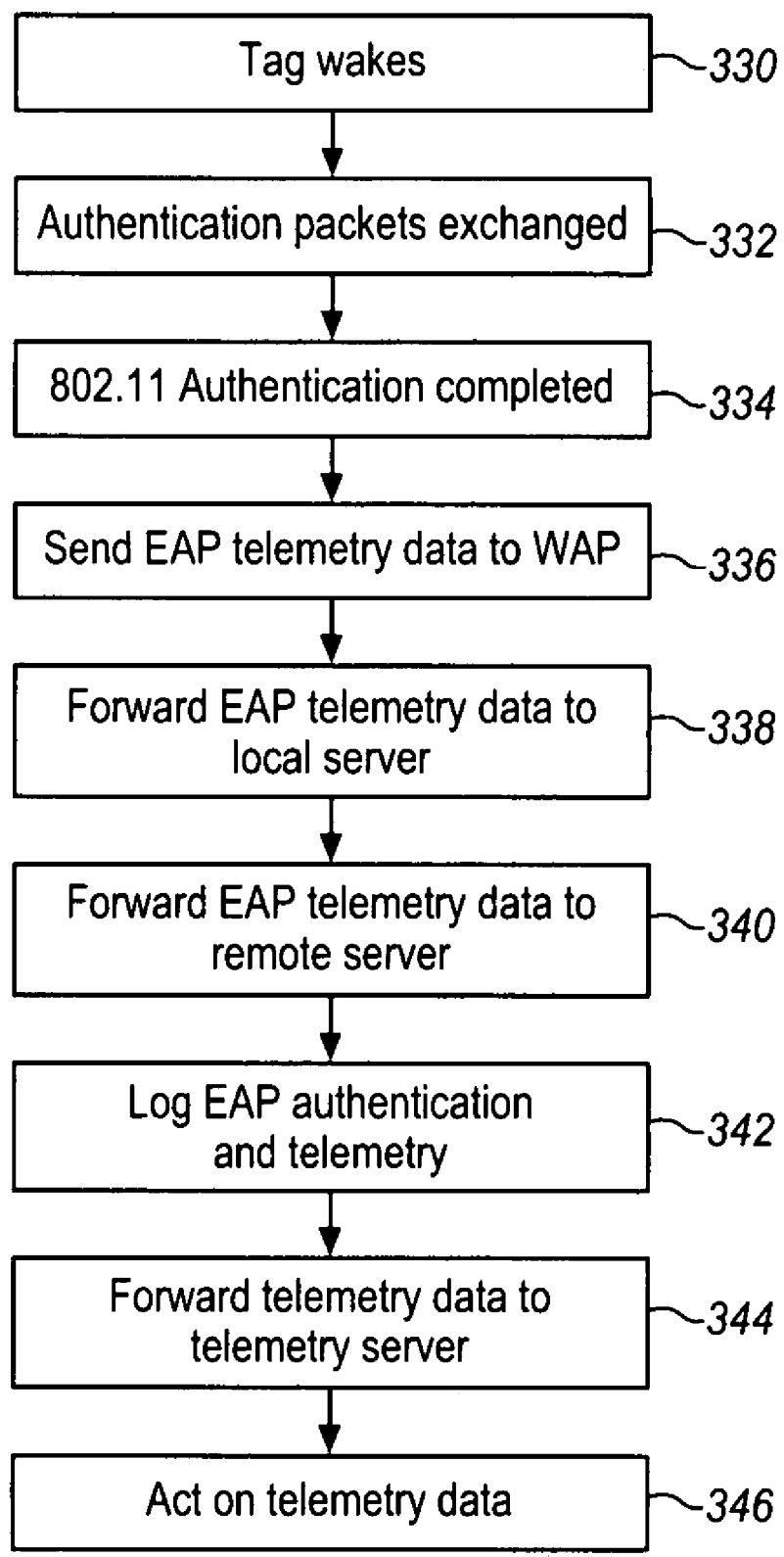
FIG. 5 is a process flow diagram of sending telemetry data from a tag according to an embodiment of the present invention.

This approach may be summarized in the process flow diagram of FIG. 5. At block 330, the tag wakes for any of a variety of reasons. At block 332, 802.11 authentication packets are exchanged between the WAP and the tag. The authentication packets in the example of 802.11 layer 2 packets, mentioned above, will typically include association at block 334, the 802.11 authentication is successfully completed. After 802.11 authentication, at block 336 the tag sends its telemetry information to the WAP encapsulated within EAP packets.

The RFID tag 310 may take a variety of different forms. One example is provided below. The tag may be equipped with a clock so that events may be flagged with the time of their occurrence. In some cases, this information may be enough. For example, if the attached goods were perishable and they arrived at their destination late, then that information in and of itself may be enough to infer whether the goods are in good condition or not. The tag may also have environmental sensors for temperature, humidity, atmospheric pressure or any of a number of other conditions. The tag may then monitor at what time and for how long these conditions exceeded limits. This may indicate that frozen goods, for example, have been compromised by exposure to above freezing temperatures for more than some amount of time. As another example, for shipments by air, if the air pressure inside the cargo hold drops below some amount that may indicate that the goods may be compromised. The tag may also have a location system, such as a GPS (Global Positioning System) or wireless telephony system, that allows it to determine its location at different times along the route. Any information gathered by the tag may be accumulated and provided to the WAP as telemetry data.

At block 338, the WAP forwards the packets with the telemetry data to the local server within EAP authentication packets. The packets may also include the identity of the tag, the time at which the authentication occurred, and any other useful information. As in FIG. 3, the local server is able to act as a proxy to forward the EAP packets with telemetry and authentication to the supplier's server at block 340. The supplier's server may log the authentication packet and any other data desired at block 342.

The telemetry data may then be extracted from the EAP packets and forwarded to the telemetry server at block 344. The telemetry data may be used to perform order fulfillment, keep shipping records, analyze the information to determine if the goods have arrived in good condition, and perform a variety of other tasks. At block 346, the telemetry data is acted upon. In the example of FIG. 4, an accounting application server receives the telemetry data and issues invoices, insurance claims, delivery payments and other accounting transactions. However, more or fewer actions may be taken than those described above.

Figure 6:
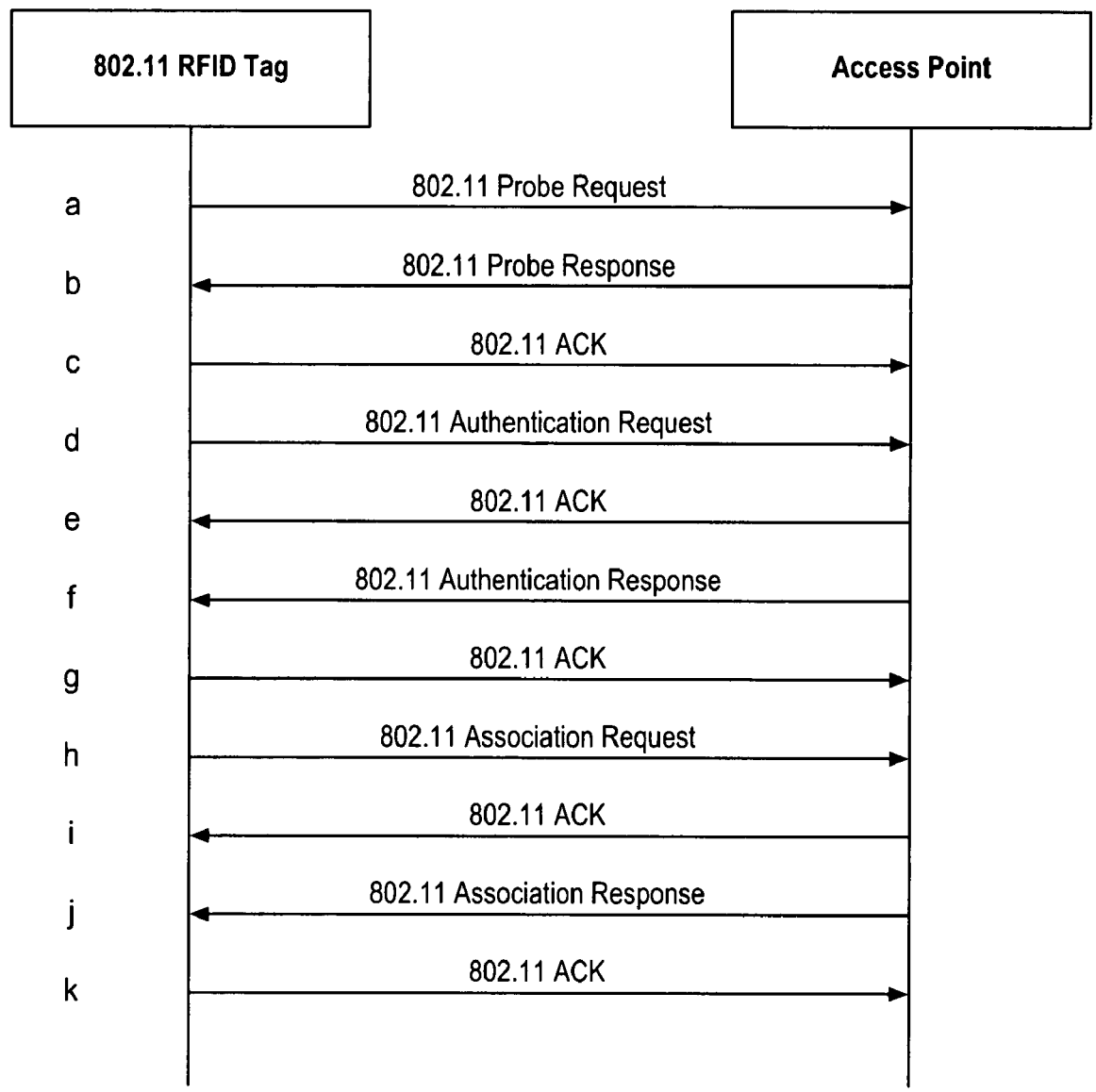
FIG. 6 is a signal flow diagram between an RFID tag and an access point of authenticating a tag according to an embodiment of the present invention.

FIG. 6 shows an example of packet exchanges that may be used between the various parties of FIGS. 1 and 3. The example of FIG. 6 is in the context of 802.11 authentication. However, a wide range of other wireless protocols and radio standards may be applied, depending on the particular application. 802.11 authentication precedes EAP authentication, which is shown separately in FIG. 7.

FIG. 6 shows an 802.11 authentication between a tag 110/310 and an access point or wireless access point 112/312. At line a, the tag sends a Probe Request. At line b, the AP responds with a Probe Response. This is acknowledged by the tag with an ACK at line c. The tag then sends an Authentication Request at line d and the AP provides an ACK at line e.

At line f, the AP sends an Authentication Response, to which the tag sends an ACK at line g. The tag then sends an Association Request at line h. The AP responds with ACK at line i and the Association Response at line j. The exchange is completed with an ACK from the tag at line k.

The probe request may be preceded by a poll or wake signal from the access point or from a tag reader or another device. The remaining signals are conventional operations performed for 802.11 authentication. After the tag sends ACK in response to the AP's Association Request, the authentication is complete. The tag is authenticated and associated to the access point using standard 802.11 management frame exchanges. The RADIUS server is not yet involved at this stage.

Figure 7:
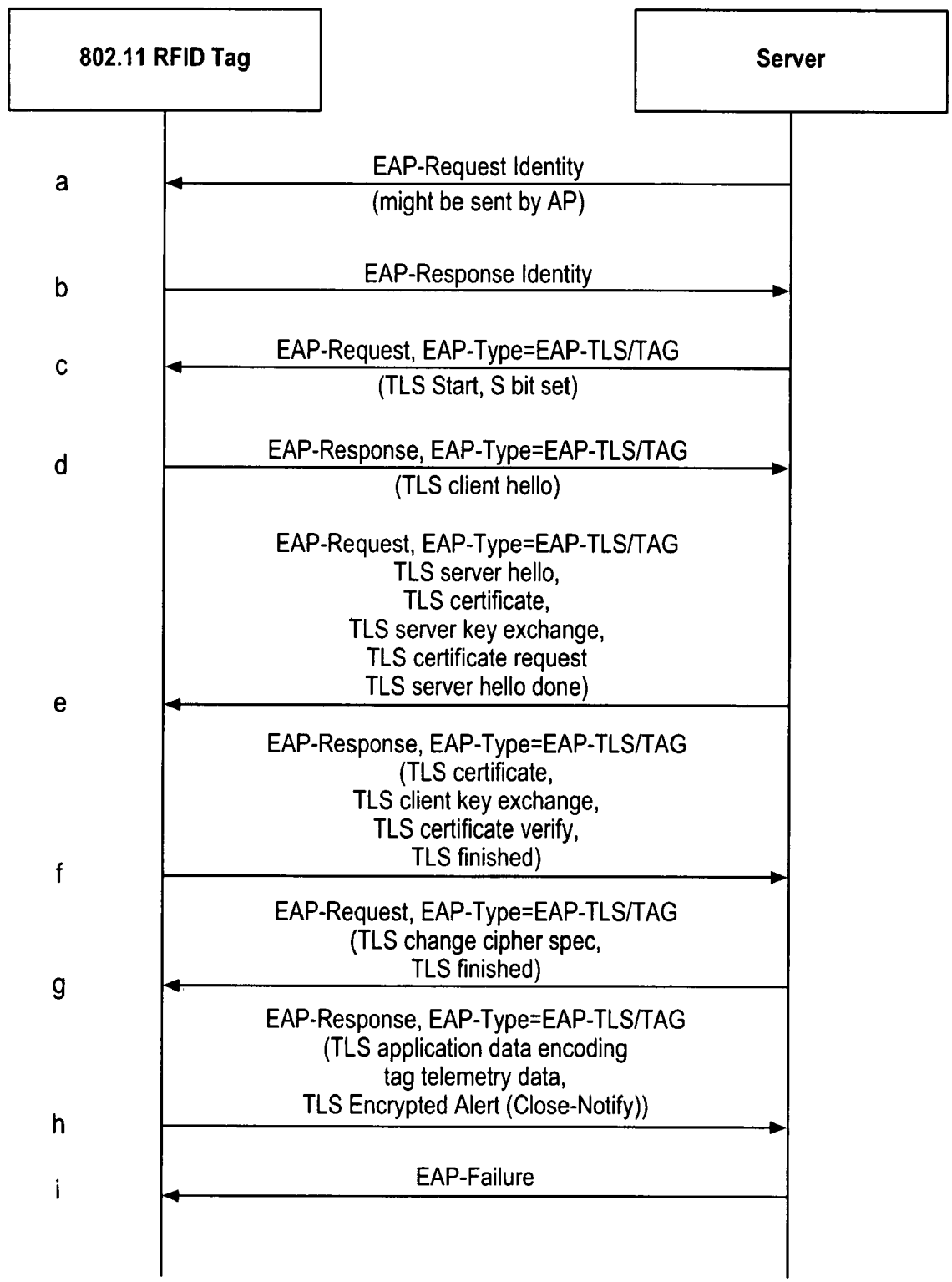
FIG. 7 is a signal flow diagram between an RFID tag and a server of authenticating a tag according to an embodiment of the present invention.
Figure 8:
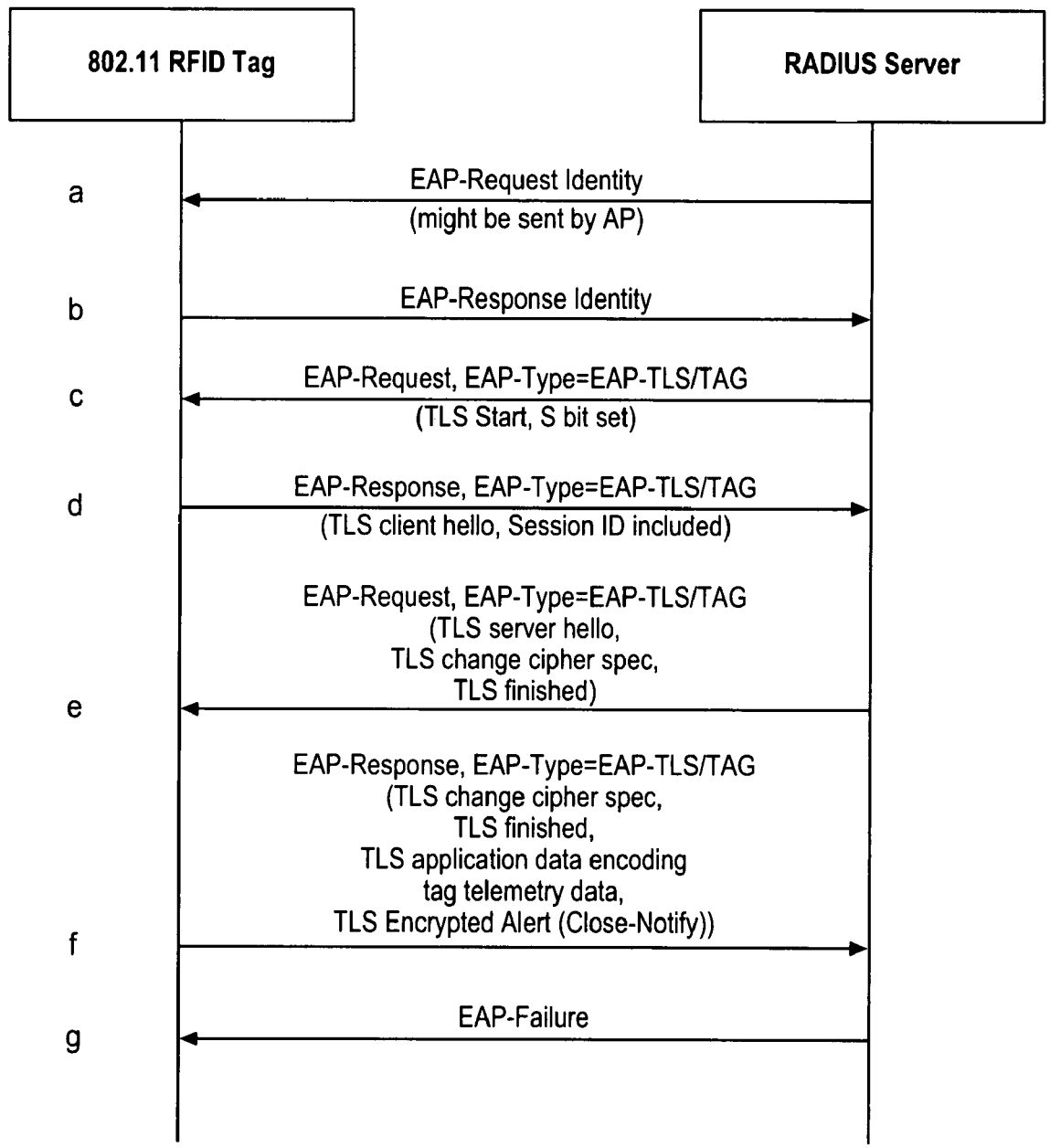
FIG. 8 is a signal flow diagram between an RFID tag and a server using session resumption according to an embodiment of the present invention.

After the tag is associated, it may then authenticate to a RADIUS server that supports EAP-TLS. This is shown in FIG. 7. EAP packets sent between the tag and the AP may be encapsulated within EAPOL (EAP over LAN) packets. EAP packets sent between the AP and the RADIUS Authentication Server may be encapsulated in RADIUS packets. Only the EAP packets between the Tag and the RADIUS server are shown in FIGS. 7 and 8 in order to simplify the drawings. In the present example, the AP only forwards the frames and does not process their contents.

Present EAP standards do not provide for the transmission of telemetry data at the authentication and identity levels. However, there are fields available that may be used for this kind of data. The only adaptation required is to configure the servers to look for the information in the appropriate fields. By using existing fields, the communications protocols do not need to be affected and any device in the communication link that does not interpret the data does not need to be modified in any way.

One such available field is the type field in the EAP packet header. EAP-TLS may be adapted to carrying telemetry data by changing the type field value in each EAP-TLS EAP packet header from the value for EAP-TLS (13) to the value for an Expanded Type (254). The RADIUS server can then determine that the EAP packets should be sent to the software module that deals with telemetry data by looking at the additional vendor ID and vendor type fields that occur in an Expanded Type EAP frame. In the event that different tags encapsulate telemetry data in different ways, the particular approach used by a particular tag may be determined by looking at the vendor ID and vendor type. Some existing EAP methods such as EAP-FAST can be adapted more easily to carrying telemetry data because they already support transmission of data in TLV (type, length, value) fields.

Referring to FIG. 7, in contrast to FIG. 6, the communications are shown as being between the RFID tag and a server. The server is a generalized server and may be any one of the servers shown in the figures. In many applications, the server may be the supplier RADIUS server. While the communication is shown as being direct between the tag and the server, these communications will be through the WAP and may also be through intermediate servers, routers, switches and other devices. In the example of FIG. 3, for example, the communication may be through the WAP 312, customer server 314, and the Internet 316.

The exchange of FIG. 7 begins with an EAP-Request Identity at line a. This might be sent by the WAP, rather than the server, depending on the implementation. The request may be made based, at least in part, on the established authentication. The tag may then respond with an EAP-Response Identity at line b. With the identity established, the server may send at line c an EAP-Request. A first request may be EAP-Type=EAP-TLS/TAG (TLS Start, S bit set). The tag answers at line d with EAP-Response, EAP-Type=EAP-TLS/TAG (TLS client hello). With TLS identified, at line e the server sends: EAP-Request, EAP-Type=EAP-TLS/TAG (TLS server hello, TLS certificate, TLS server key exchange, TLS certificate request, TLS server hello done).

According to EAP-TLS standards, the tag may then respond at line f with:

EAP-Response, EAP-Type=EAP-TLS/TAG (TLS certificate, TLS client key exchange, TLS certificate verify, TLS finished).

The server at line g may then send:

EAP-Request, EAP-Type=EAP-TLS/TAG (TLS change cipher spec, TLS finished).

The tag may then respond at line h with:

EAP-Response, EAP-Type=EAP-TLS/TAG (TLS application data encoding, tag telemetry data, TLS Encrypted Alert (Close-Notify)

This will prompt the server at line i to send EAP-Failure.

The EAP-TLS/TAG frame exchange includes EAP-Response packets from the tag which contain encrypted telemetry data at line h. The tag may send a number of such packets with telemetry data by setting the 'more fragments' bit in the header of the EAP Response in line h. The total amount of data the tag can send as part of a single EAP frame exchange is approximately 16 Kilobytes. The server will send an EAP-Request frame to acknowledge each EAP-Response frame from the tag until it receives the Close-Notify.

As shown in FIG. 7, the tag sends an EAP-Response in reply to each EAP-Request from the server. Included in the final EAP-Response is a Close-Notify message which indicates that all telemetry data has been transmitted. The final packet from the server is an EAP-Failure, which means that the access point will not be provided with the encryption keys which would normally allow the tag direct access to the wireless network. This is an advantage over using normal EAP methods for supporting tags in supply chain applications since the destination network remains very secure. As an alternative, some RADIUS servers may be configured to always deny network access to a wireless client regardless of the authentication result. A future enhancement to the EAP protocol would be to include a result, in addition to EAP-Fail and EAP-Success, that would be EAP-Success-No-Access, or a similar result, indicating that authentication was successful but that the device is not to be granted network access.

At the end of the frame exchange of FIG. 7, the tag has informed the supplier of its arrival, sent the required telemetry data in one or more EAP-Response frames, and has received an acknowledgement that the telemetry data has been received by the server. Therefore the tag may now sleep, depending on the application.

The full EAP-TLS handshake is expensive in terms of CPU time for the tag and the number of transmitted packets. In some cases, this may present a significant drain on the available power of the tag. If the tag relies on battery power, then the tag will last longer or may be made with a smaller battery, if such exchanges can be minimized or if the time and number of messages may be reduced. EAP-TLS supports a session resumption mechanism which allows a new connection to use an already-established master secret. Session resumption allows a tag to perform the most expensive parts of the handshake, that is the exchange of certificates and public key cryptographic operations, once and then resume the same session multiple times at much lower computational and transmission cost. This is useful when the tag is likely to transmit telemetry data several times during its journey from supplier to customer: Session resumption may also allow a special server to perform the full EAP-TLS handshake on behalf of the tag so that the session details and credentials can be downloaded to the tag before it commences its journey. This means that a tag would never need to perform a full EAP-TLS handshake. This may be applicable to any EAP method that supports session resumption.

Without EAP-TLS session resumption, the tag may need to send and receive certificates and perform the full public key cryptographic operations each time it wishes to transmit telemetry data. This would require the process of FIG. 7 to be repeated each time the tag has telemetry data to send.

FIG. 8 shows an example exchange that takes advantage of session resumption. In this case, the tag has already associated and performed the full EAP-TLS authentication without session resumption once, so the tag may resume the existing session with the supplier RADIUS server that supports EAP-TLS with the embedded telemetry data.

As shown in FIG. 8, at line the server sends an EAP-Request Identity to the tag. Alternatively, this might be sent by the AP or the exchange may be initiated by the tag through the AP before the EAP Request Identity is sent. The tag responds on line b with EAP-Response Identity. The server then sends on line c:

EAP-Request, EAP-Type=EAP-TLS/TAG (TLS Start, S bit set) and on line d, the tag responds with:

EAP-Response, EAP-Type=EAP-TLS/TAG (TLS client hello, Session ID included).

With the session established, the server can send on line e:

EAP-Request, EAP-Type=EAP-TLS/TAG (TLS server hello, TLS change cipher spec, TLS finished).

The tag may respond on line f with:

EAP-Response, EAP-Type=EAP-TLS/TAG (TLS change cipher spec, TLS finished, TLS application data encoding tag telemetry data, TLS Encrypted Alert (Close-Notify)).

This packet will include the telemetry data and, as with FIG. 7, will indicate if there are more packets of telemetry data to send. The TLS Encrypted Alert (Close-Notify) is sent with the last packet of telemetry data. When the Close-Notify has been sent, the server responds with EAP-Failure on line g to prevent access to the network.

Again in FIG. 8, at the end of the frame exchange, the tag has informed the supplier of its arrival, sent the required telemetry data in one or more EAP-Response frames, and has received an acknowledgement that the telemetry data has been received by the server. Therefore the tag may now sleep, depending on the application.

As mentioned above, tag telemetry data may be encapsulated in Type-Length-Value (TLV) fields. TLVs may be defined for sensor readings such as temperature and for events such as seal opening and closing, as well as for any other parameters that the tag measures. The data may be encapsulated into the TLV in a variety of different ways. The Table shows one example of how to encapsulate a temperature value.

TABLE

| Octet | Field | Description |
|---|---|---|
| 0 | Type | Temperature telemetry type = 50 |
| 1 | Length | 0-255 |
| 2-5 | Temperature | 32 bit integer (units: microdegrees Celsius) |

In the example of the Table, the first octet (0) contains the code 50 to indicate that the telemetry data relates to temperature. The second octet (1) indicates the length of the temperature value and the third through sixth octets (2-5) provide the actual temperature value. This encoding is provided only as an example of how a temperature might be encapsulated within an EAP packet. The headers and values may be designated differing number of bits or octets and the precision of the values may be modified to support different applications. The temperature value may be given a time stamp, or a ranging value, or other data may also be added to the TLV.

In the example above, the telemetry data is transmitted in EAP packets using further encapsulation of the telemetry TLVs within TLS records which are themselves contained within EAP packets. The EAP packets are then carried by EAPOL frames between the tag and the AP, and by RADIUS packets between the AP and the RADIUS server.

The protocol layering for EAP-TLS may be structured as follows:
Telemetry Data TLV
TLS
EAP
Carrier Protocol (EAPOL or RADIUS etc)

Further layering typically exists below the respective carrier protocols. Typically, EAPOL frames are encapsulated within 802.11 MAC frames. RADIUS packets are encapsulated in UDP (User Datagram Protocol) frames and then Ethernet frames, or another MAC/physical layer protocol.

FIG. 9 shows an example of an 802.11 packet that has been adapted to contain telemetry data. Such a packet may be used, for example, in the wireless link between a tag and an access point (WAP). In accordance with conventions for 802.11, the packet begins with an 802.11 MAC header 911. This is followed with the 802.2 LLC (Logical Link Control) header 913. This is followed by a header for the 802.1x authentication protocol 915 and then an EAP header. The EAP header is followed by the TLS (Transport Layer Security) Record header 919 which precedes the TLS Record Data. The TLS Record Data contains the EAP data fields and, as described above, may include the TLVs including any embedded telemetry from the tag. The TLS Record Data is followed by the TLS Record MAC 923 and the packet is closed with the 802.11 FCS (Frame Check Sequence).

As can be seen in FIG. 9, EAP-TLS provides a standardized system for encapsulating its data within 802.11 packets. The EAP-TLS packet includes TLS data fields and the tag may encapsulate its telemetry data within these data fields. In the example above, the telemetry data is encrypted and encapsulated into TLVs of the EAP-TLS packet.

FIG. 10 shows an example of an Ethernet packet that contains telemetry data encapsulated into an Attribute/Value pair of a RADIUS packet. Such a packet may be used for wired connections or for wireless Ethernet, such as may be used for communications between a wireless access point and a RADIUS server. The Ethernet packet begins with an Ethernet header 951 according to standard protocols. This is followed by the IP (Internet Protocol) header 953 and by the UDP (User Datagram Protocol) Header 955. The RADIUS header 957 follows this and then begins a sequence RADIUS Attribute/Value pairs 959, 961, 963 which continue to the end of the packet. These Attribute/Value pairs are well-defined under RADIUS. Note that there is a FCS field at the end of the Ethernet packet which is not shown in the drawing.

Within each Attribute/Value pair, there may be an EAP header 965, followed by a TLS Record Header 967, followed by the TLS Record Data 969 and then the TLS Record MAC 971. Notice that this is the same structure as in FIG. 9. As in the example of FIG. 9, the telemetry data may be embedded within the TLS Record Data in Type, Length, Value Fields or in another suitable location. As can be seen by comparing FIGS. 9 and 10, the conventional packet formats allow the telemetry data from the tag to be transmitted over a variety of different network protocols.

The underlying medium is not restricted to 802.11 wireless links and so the approaches described above may be applied to devices connected by wire or by other wireless means. The approaches described above are also generally applicable to sending authenticated telemetry data from a sensor device to a telemetry server across a network without the requirement for the sensor device to have an IP address. The approaches also allow encrypted data to flow in both directions. This allows control and configuration data to be downloaded to the tag.

Figure 11:
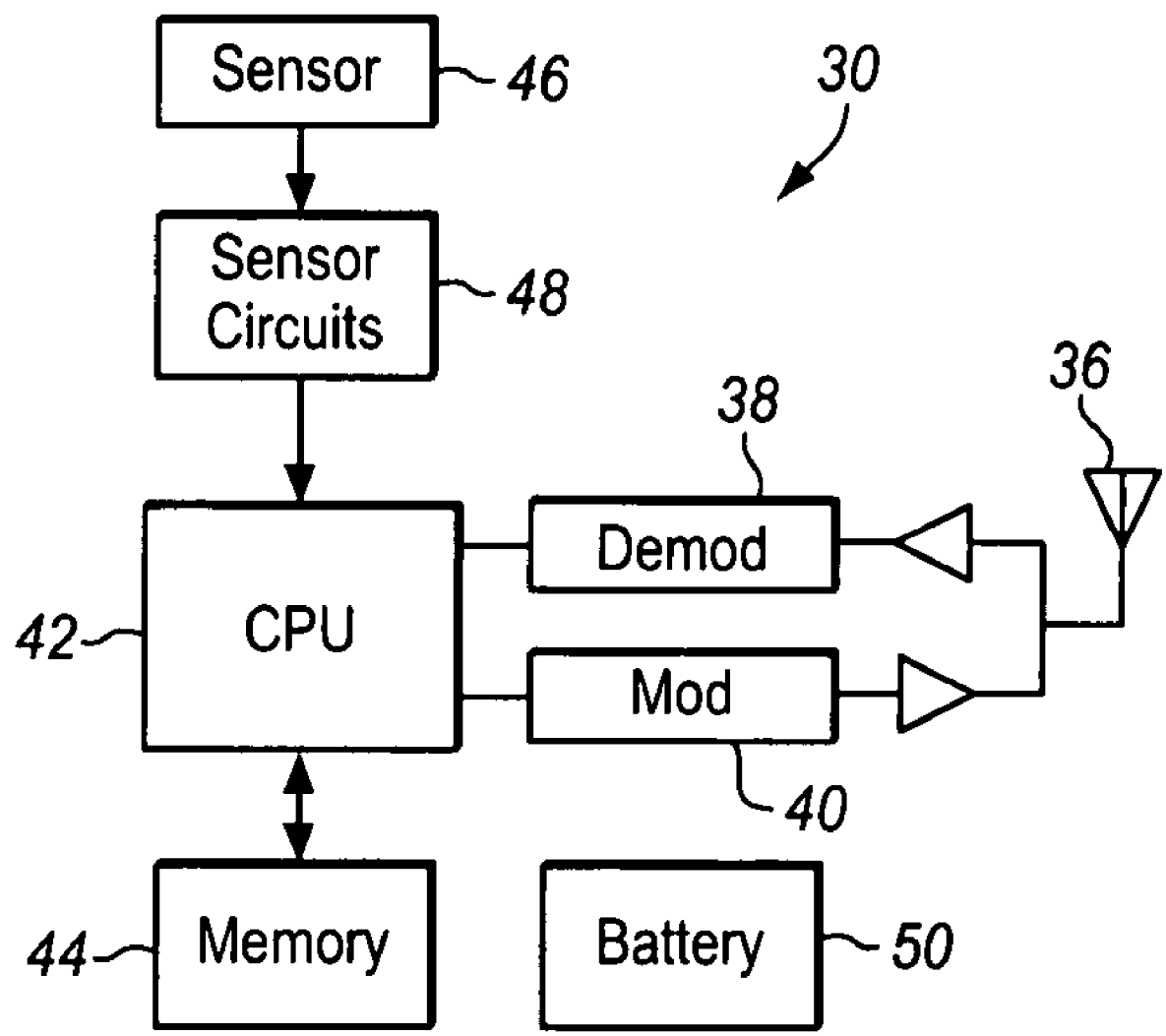
FIG. 11 is a block diagram of a receiver and transmitter suitable for an RFID tag or access point according to an embodiment of the present invention.

FIG. 11 shows an example of working parts that may be included in an active RFID tag suitable for use in the examples of FIGS. 1 and 3. The RFID tag may be configured to also perform as a WiFi client that is being used to sense its environment and report via its WiFi link. Such a device may be controlled by a CPU (Central Processing Unit) 42 or microcontroller executing instructions in a semiconductor memory.

The tag 30 communicates with the wireless access point 110, 310 through an antenna 36 of the tag 30. The tag has a receive chain 38 with a demodulator and a transmit chain 40 with a modulator that are both, in this example, coupled to the CPU 42. The CPU is coupled to a memory 44 for storing data, intermediate values and programming code. The tag may also have one or more sensors 46 coupled through driver and conversion circuitry 48 to the CPU.

A battery 50 may be used to power the tag, however, any other type of energy storage or generation cell may be used instead of, or in addition to the battery including, a solar cell, energy harvester or other power supply. Unlike the energy harvester of a passive RFID tag, the battery of this example of an active RFID tag may require replacement or recharging.

Data may be transmitted to the tag 30 from the wireless access point. Received data may be demodulated in the receive chain 38 and presented to the CPU 42. The CPU may be used to control the modulator in the transmit chain 40 to send data back to the WAP. The received data may be a poll or query, values to store in the memory 44 or new programming instructions. It may also be parameters to be used in running the programs in the memory. For example, the WAP may send timing parameters to use in determining when to measure a sensor value or send a report.

In one example, the memory includes configuration registers that may be used to select options and values for programs executed by the processor. The configuration registers may, include addresses, port numbers, encryption keys, timing or clock values, protocol settings and values, among other parameters.

Using the sensor (for example a push button, a thermometer, an accelerometer, a location system, etc.) and the sensor circuit (for example a circuit to supply current to monitor the push button) the CPU may monitor the state of its environment and send data to the WAP. The sensor may monitor temperature, pressure, humidity, location, impacts or shaking with an accelerometer, or any other environmental parameters. The sensor or sensor circuit may also track these physical parameters over time and determine whether a specified range or threshold is satisfied. For example, the sensor circuit may determine whether a tag has been kept within a specified temperature range.

Depending on the programming, the tag, as an active RFID tag, may send a periodic ID signal or respond to polling signals according to any of a variety of different protocols or routines. The position of the tag and the best connections for RF communication may be determined in a variety of different ways. In one example, a group of WAPs measure the RSSI (Received Signal Strength Indicator) of the tag to triangulate the position and determine the best WAP for communications.

The tag may be operated in one of at least two states, a low-power sleep state and a high-power active state. When active, the tag may provide an identification number upon request.

The following abbreviations have been used in the present description:

| | |
|---|---|
| AP | Access Point |
| EAP | Extensible Authentication Protocol |
| IANA | Internet Assigned Numbers Authority |
| IP | Internet Protocol |
| PARC | Palo Alto Research Centre, Palo Alto, California |
| PEAP | Protected Extensible Authentication Protocol |
| RADIUS | Remote Authentication Dial-In User Service |
| TLS | Transport Layer Security |
| TTLS | Tunneled TLS |
| SSID | Service Set Identifier |
| UDP | User Datagram Protocol |
| WAP | Wireless Access Point |
| WPAv1 | Wi-Fi Protected Access version 1 |
| WPAv2 | Wi-Fi Protected Access version 2 |
| WLAN | Wireless Local Area Network |

A lesser or more complex tag, access point, server, communications protocol, data encapsulation and system design may be used than those shown and described herein. Therefore, the configurations may vary from implementation to implementation depending upon numerous factors, such as price constraints, performance requirements, technological improvements, or other circumstances. Embodiments of the invention may also be applied to other types of inventory tracking and control systems and different RFID systems that use different types of transponders and protocols than those shown and described herein.

While the embodiments of the invention have been described in the context of a particular location, similar communications may be performed at many locations. As the shipped goods move from one location to another, the position and location of the goods may be determined at each location or each significant location. For example, in some cases, the goods may arrive at an intermediate or wholesale warehouse before being loaded onto trucks for local delivery. The tags may be read at the intermediate warehouse and also at the local destination. Tags may also be read at a shipping dock as the goods are loaded or unloaded from a ship or an airplane.

In the description above, numerous specific details are set forth. However, it is understood that embodiments of the invention may be practiced without these specific details. For example, well-known equivalent circuits, components, assemblies and configurations may be substituted in place of those described herein, and similarly, well-known equivalent techniques, processes, and protocols may be substituted in place of the particular techniques described. In other instances, well-known circuits, structures and techniques have not been shown in detail to avoid obscuring the understanding of this description.

While the embodiments of the invention have been described in terms of several examples, those skilled in the art may recognize that the invention is not limited to the embodiments described, but may be practiced with modification and alteration within the spirit and scope of the appended claims. The description is thus to be regarded as illustrative instead of limiting.

What is claimed is:

1. A method comprising:
   authenticating a tag with a local area network, the tag being associated with shipped goods, the local area network being associated with a destination of the goods;
   receiving an identification from the tag together with other data regarding the tag in a data packet encapsulated within a header of a packet of a general purpose communication protocol;
   sending the authentication and the identification to a remote location as an indication of the goods being at the destination.

2. The method of claim 1, further comprising ending communication with the tag after authentication.

3. The method of claim 1, further comprising receiving telemetry data from the tag and sending the telemetry data with the authentication and the identification.

4. The method of claim 3, wherein the telemetry data comprises environmental condition information sensed by the tag.

5. The method of claim 3, further comprising encapsulating the telemetry data in a field of a general purpose communication protocol and wherein sending the telemetry data comprises sending the telemetry data after encapsulation.

6. The method of claim 5, wherein encapsulating comprises encapsulating the telemetry data in a type field within a header of a packet of the communication protocol.

7. The method of claim 6, wherein the type field is an Expanded Type value and the communication protocol is an Extensible Authentication Protocol.

8. An apparatus comprising:
   a wireless interface to communicate with tags, the tags being associated with shipped goods;
   a network interface to communicate with a remote location; and
   a processor to drive the apparatus to receive an identification from the tag over the wireless interface together with other data regarding the tag in a data packet encapsulated within a header of a packet of a general purpose communication protocol, to authenticate the tag with the network over the network interface, and to send the authentication and the identification to a remote location through the network as an indication of the goods being at the destination.

9. The apparatus of claim 8, wherein the processor further drives the apparatus to receive telemetry data from the tag and send the telemetry data with the authentication and the identification.

10. The apparatus of claim 9, wherein the processor is further to encapsulate the telemetry data in a field of a general purpose communication protocol and to send the telemetry data after encapsulation.

11. A method comprising:
receiving a packet from a local area network access point;
reading an identification of the local area network access point from the packet;
reading an identification of a tag from the packet, the identification together with other data regarding the tag being in a data packet encapsulated within a header of a packet of a general purpose communication protocol, the tag being associated with shipped goods;
reading a time stamp from the packet; and
logging the arrival of the goods at the location of the local area network access point at the stamped time based on receiving the packet.

12. The method of claim 11, wherein the packet is an authentication packet.

13. The method of claim 11, further comprising decapsulating telemetry data from the packet and wherein logging comprises logging the decapsulated telemetry data.

14. The method of claim 13, wherein decapsulating telemetry data comprises decapsulating the telemetry data from a field in a header of the packet.

15. The method of claim 14, further comprising sending a notification of the logged arrival to inventory tracking system.

16. The method of claim 14, further comprising sending a notification of the logged arrival to a billing system.

17. A an apparatus comprising
a network interface to receive a packet from a local area network access point;
a processor to read an identification of the local area network access point from the packet, to read an identification of a tag from the packet, the identification together with other data regarding the tag being in a data packet encapsulated within a header of a packet of general purpose communication protocol, the tag being associated with shipped goods, and to read a time stamp from the packet; and
a log to log the arrival of the goods at the location of the local area network access point at the stamped time based on receiving the packet.

18. The apparatus of claim 17, wherein the packet is an authentication packet.

19. The apparatus of claim 17, wherein the received packet contains encapsulated telemetry data for entry into the log.

20. The apparatus of claim 17, wherein the processor is further to notify a billing system of the logged arrival through the network interface.

* * * * *